United States Patent [19]

Hillemeier et al.

[11] Patent Number: 4,670,315

[45] Date of Patent: Jun. 2, 1987

[54] PROCESS FOR PROVIDING A SYNTHETIC RESIN COATING ON A CONCRETE STRUCTURE

[75] Inventors: Bernd Hillemeier, Wiesbaden; Rolf Wichern, Hamburg, both of Fed. Rep. of Germany

[73] Assignee: Hochtief Aktiengesellschaft vorm, Gebr. Helfmann, Essen, Fed. Rep. of Germany

[21] Appl. No.: 808,892

[22] Filed: Dec. 13, 1985

[30] Foreign Application Priority Data

Dec. 13, 1984 [DE] Fed. Rep. of Germany ....... 3445396

[51] Int. Cl.$^4$ .......................... F16L 9/14; B05D 7/22; B05D 1/36
[52] U.S. Cl. ....................................... 428/36; 138/146; 138/177; 138/DIG. 2; 138/DIG. 6; 427/230; 427/235; 427/236; 427/403
[58] Field of Search ..................... 427/206, 403, 393.6, 427/181, 183, 231, 232, 233, 235, 236, 230; 428/36; 138/146, 177, DIG. 6, DIG. 2

[56] References Cited

U.S. PATENT DOCUMENTS

| | | | |
|---|---|---|---|
| 2,793,130 | 5/1957 | Shannon et al. | 427/403 X |
| 3,080,253 | 3/1963 | Dietz et al. | 427/203 X |
| 3,689,305 | 9/1972 | Hausmann | 427/403 |
| 3,819,395 | 6/1974 | Yocum | 427/403 |

Primary Examiner—Thurman K. Page
Attorney, Agent, or Firm—Karl F. Ross; Herbert Dubno

[57] ABSTRACT

A process for providing a corrosion resistant synthetic plastic resin coating on a surface of a concrete structure comprises cleaning the surface of the concrete structure, forming a fiber containing sprayed concrete layer having a plurality of fiber components therein, for example glass fibers or plastic fibers, on the surface of the concrete, and subsequently applying a synthetic plastic resin thereto, whereby the fiber components projecting from the fiber containing sprayed concrete layer act to anchor the synthetic plastic resin to form the corrosion resistant coating. The corrosion resistant synthetic plastic resin coating preferably contains a polyester resin, and a polymer-cement-concrete base layer may be used to help bond the fiber containing sprayed concrete layer to the cleaned concrete surface.

11 Claims, 1 Drawing Figure

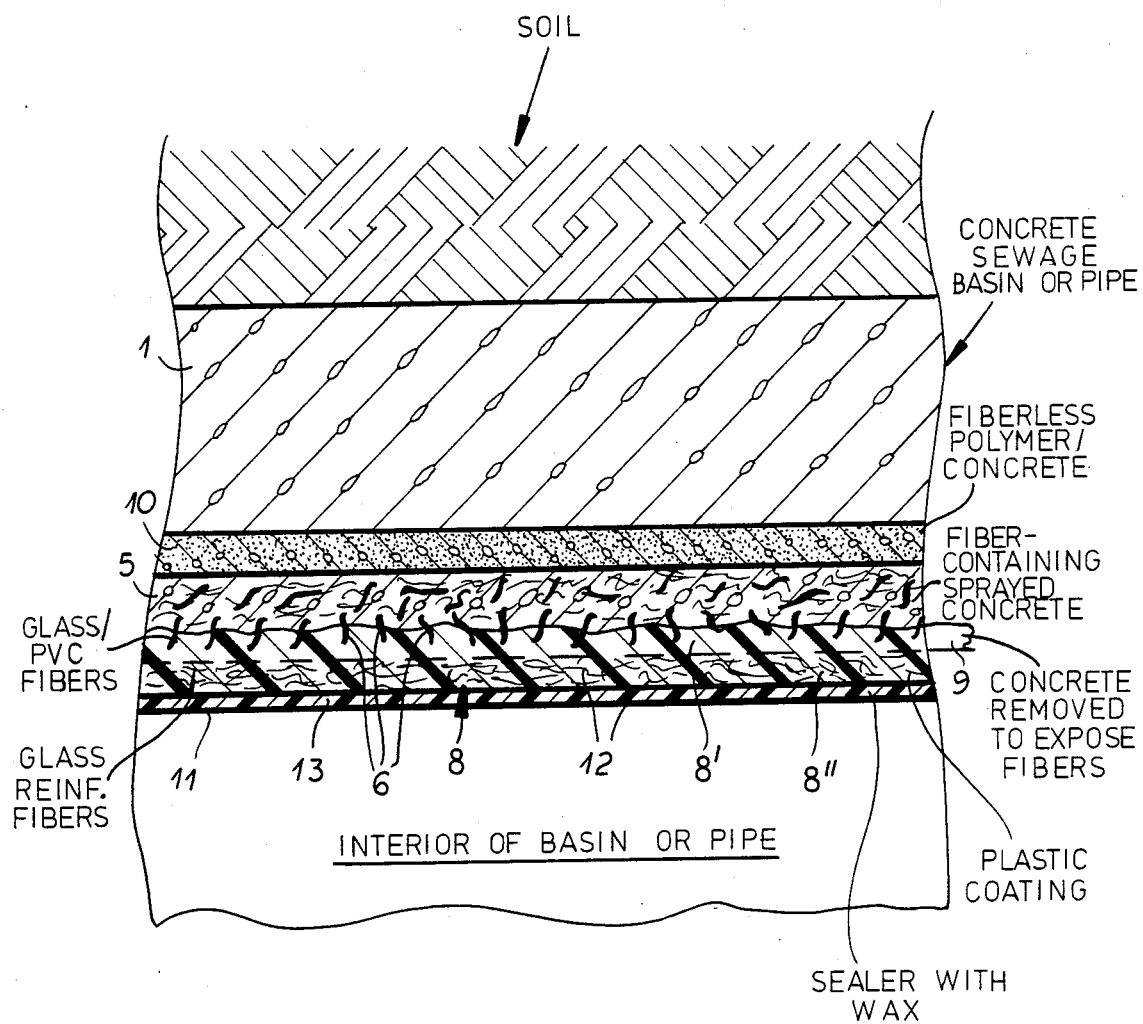

PROCESS FOR PROVIDING A SYNTHETIC RESIN COATING ON A CONCRETE STRUCTURE

FIELD OF THE INVENTION

Our present invention relates to a process for providing a corrosion resistant synthetic resin (plastic) coating on a surface of a concrete structure and, more particularly, to a process in which a synthetic resin or plastic is applied to a surface of a concrete waste-water tank or sewage basin, conduit, or the like to form a corrosion resistant coating thereon.

BACKGROUND OF THE INVENTION

It is known to provide a corrosion resistant synthetic resin coating on a concrete structure by applying a curable synthetic resin to the surface of the concrete, e.g. a concrete waste water tank.

The surface to be coated is subjected to a cleaning treatment, and the synthetic resin is applied to the cleaned surface to form the corrosion resistant coating.

The cleaning treatment can be accomplished by steps such as sand blasting, steam cleaning, the use of pressurized water jets, flame cleaning and by abrading process.

The synthetic resin or plastic typically comprises a polyester resin, an epoxide resin, a polyurethane resin, an acrylic resin, or the like. Preferably a polyester resin is used. One can apply the synthetic resin or plastic directly to the cleaned surface, for example by spraying. The corrosion resistant synthetic plastic resin coating can also be formed by rolling it or troweling it onto the surface.

Both thick and thin corrosion resistant synthetic resin coatings however have a poor adhesion which is time dependent and may loosen readily from the surface of the concrete structure.

We have discovered that the loosening of these corrosion resistant synthetic resin coatings may be due to moisture penetration. Concrete is, of course, impermeable to water in liquid form, but is permeable to water vapor. Diffusion processes, in which water in the vapor phase from the ground is transported through the wall of the concrete to the inside surfaces, appear to result directly in an accumulation of water at the interface between the corrosion resistant synthetic resin coating and the coated concrete surface.

The pressure behind the corrosion resistant synthetic resin coating so increases with time, that it eventually exceeds the strength of the coating on the concrete foundation, causing loosening, flaking, and peeling.

OBJECTS OF THE INVENTION

It is an object of our invention to provide an improved process for providing a corrosion resistant synthetic resin coating for a concrete structure which has better adhesion, greater useful life and avoids drawbacks of earlier methods.

It is also an object of our invention to provide an improved process for providing a corrosion resistant plastic coating for a concrete structure, particularly a concrete waste basin which does not loosen, flake, or peel.

It is yet another object of our invention to provide an improved corrosion resistant synthetic resin coating for a concrete structure which is durable and continues to adhere as time progresses, and such that the plastic coating will not flake or peel off from the surface of the concrete because of a buildup of water pressure behind it.

SUMMARY OF THE INVENTION

These objects and others which will become more apparent hereinafter are attained in accordance with our invention in a process for providing a corrosion resistant synthetic resin coating on a surface of a concrete structure which comprises subjecting the surface of the concrete structure to a cleaning treatment, and bonding the corrosion resistant synthetic resin coating to the surface of the concrete.

According to our invention a fiber-containing sprayed concrete layer is first formed on the surface of the concrete after cleaning. The surface of the fiber-containing sprayed concrete layer has a multiplicity of fibers projecting therefrom.

To the surface of the fiber-containing sprayed concrete layer from which fibers embedded therein project, the synthetic resin is applied. The projecting fiber components anchor the resulting corrosion resistant synthetic resin coating to the fiber-containing sprayed concrete layer which in turn is bonded without a moisture sensitive interface to the underlying concrete substrate.

In practice the synthetic resin which can be any of those mentioned previously, in order to be effectively anchored to the fiber components projecting from the intermediate layer of fiber containing sprayed concrete, should not have a viscosity which is too large during application, i.e. should not make it difficult to allow the fibers to embed therein.

In the concrete structure or basin having the internal coating of our invention the diffusive flow of water vapor causing damage or destruction can not be stopped without other additional efforts being made externally of the concrete structure, but instead the diffusion is permitted or at least taken into account.

In the method of our invention however, the pressure buildup inside behind the corrosion resistant synthetic resin coating can no longer cause its destruction. Water does diffuse through the concrete, but the corrosion resistant synthetic resin coating is anchored on the fiber components somewhat away from or very slightly spaced from the surface of the fiber-containing sprayed concrete layer. The pressure is thereby reduced and the water at least in part can flow away.

The corrosion resistant synthetic resin coating and its fiber attachment are strong enough to be safe from flaking, peeling, blistering, and the like, because the fibers projecting from the concrete bond to the synthetic resin coating and the multiplicity of fibers anchor at many points in the synthetic resin coating.

The quantity of fibers provided in the fiber-containing sprayed concrete layer or intermediate layer can be selected as need requires.

When one works for example with glass or PVC fibers, a concentration of 25 kg of glass fibers per cubic meter of sprayed concrete is usually satisfactory.

According to a feature of our invention, a high degree of durability of the entire coating is achieved when the fiber-containing sprayed concrete layer is provided on a polymer/hydraulic cement concrete base layer formed directly on the cleaned surface of the concrete structure or is itself a polymer/hydraulic cement concrete layer.

The fiber-containing sprayed concrete layer can be built up from a plurality of layers. Also it can be underlain by a sprayed concrete coating, which has no fibers.

In another feature of our invention the fiber-containing sprayed concrete layer is formed with embedded synthetic plastic resin fibers projecting therefrom, for example polyvinylchloride (PVC) fibers.

In order to ensure that the fibers will project or be sufficiently exposed the fiber-containing sprayed concrete layer can be treated after application.

In a further feature of our invention a hardening retarder is applied directly to the surface of the fiber-containing sprayed concrete layer, and after attaining hydratization of the underlying portion of the fiber-containing sprayed concrete layer, the surface of the fiber-containing sprayed concrete layer is cleaned to remove the unhardened material and permit the fibers to visibly project.

The synthetic resin layer may also contain fiber pieces, e.g. glass fibers.

The corrosion resistant synthetic plastic resin can also be applied in several layers, which understandably must be composed of mutually compatible synthetic resins or plastics to endure mutual adhesion.

Usually the corrosion resistant synthetic resin coating is subsequently sealed with a sealing layer also containing a synthetic resin and which also may advantageously contain paraffin.

Synthetic plastic resins suitable for use in our invention include polyester resins, epoxide resins, polyurethane resins, and acrylic resins. The preferred choice is however a polyester resin. The fiber components of our invention are preferably glass fibers or plastic fibers, e.g. PVC fibers.

BRIEF DESCRIPTION OF THE DRAWING

The above and other objects, features, and advantages of our invention will become more readily apparent from the following description, reference being made to the accompanying drawing the sole FIGURE of which is a diagrammatic cross sectional view of a corrosion resistant synthetic resin coating an a concrete basin made by the process of the invention.

SPECIFIC DESCRIPTION AND EXAMPLE

On a wall 1 of a sewage or effluent collector pipe, duct tank or basin sand blasted or cleaned by a high pressure water jet a polymer/cement-sprayed concrete base layer 10 is formed on the cleaned concrete surface in a 5 mm thickness. It is to be understood that the shrink holes, cracks, and other surface imperfections should be repaired or filled first.

After a setting time of about an hour a fiber-containing sprayed concrete layer 5 with a coarsest grain of 8 mm gram size containing fibers 6, for example, glass fibers or plastic fibers, is formed on the cementing base layer 10. The fiber content of the fiber-containing sprayed concrete layer 5 should be about 25 kg per cubic meter.

In order to attain a good adherence for the provided synthetic resin coating 8, the exposed surface of the fiber-containing sprayed concrete layer 5 with retardent, e.g. lime by spraying and after setting of the underlying part the nonset portion is removed by flushing with water. The zone in which the concrete is removed is represented at 9. In this way the fibers bound in the sprayed concrete layer 5 on the upper surface 9 are exposed and visible. After hydratization for about 14 days the corrosion resistant synthetic resin coating 8 comprising a polyester resin can be applied. That occurs in a suitable way according to the following prescription:

First an undercoating 8' for filling of zone 9 is applied, and, of course, comprising a synthetic plastic resin, on which the layer should be built. About 300 g synthetic resin per square meter is used for this purpose. Into an additional amount of synthetic plastic resin, glass fibers 12 are worked in, which are cut from a cord. This material is applied at 8" in a coverage of 700 g per square meter, and subsequently compacted or compressed with a roller to complete the coating 8.

Subsequently to form the inner surface 11 of the tank or duct surface sealing coating 13 is provided with a thickness of about 0.3 mm. The synthetic resin used in the sealing coating 13 contains a paraffin additive as well. The amount coated on is approximately 150 g per square meter. It is also appropriate to form under the sealing coating an additional intermediate layer of the synthetic resin used for the coating without the paraffin additive.

We claim:

1. A process for providing a corrosion resistant synthetic resin coating on an internal surface of a concrete structure in the form of a waste tank or conduit, which comprises the steps of:

subjecting said internal surface of said concrete structure to a cleaning treatment;

applying a fiber-containing sprayed concrete layer onto said internal surface subjected to said cleaning treatment so that fibers bonded in said layer project from a surface thereof, away from said concrete structure; and applying a corrosion resistant resin to said surface of said fiber-containing sprayed concrete layer and bonding said resin to the projecting fibers which thereby anchor said corrosion resistant synthetic resin coating to said fiber-containing sprayed concrete layer, said fiber-containing sprayed concrete layer being filled with PVC plastic fibers to form the projecting fibers.

2. A process for providing a corrosion resistant synthetic resin coating on an internal surface of a concrete structure in the form of a waste tank or conduit, which comprises the steps of:

subjecting said internal surface of said concrete structure to a cleaning treatment;

applying a fiber-containing sprayed concrete layer onto said internal surface subjected to said cleaning treatment so that fibers bonded in said layer project from a surface thereof, away from said concrete structure; and applying a corrosion resistant resin to said surface of said fiber-containing sprayed concrete layer and bonding said resin to the projecting fibers which thereby anchor said corrosion resistant synthetic resin coating to said fiber-containing sprayed concrete layer, said fiber-containing sprayed concrete layer being treated after application to said surface so that said projecting fibers are exposed and visible.

3. The process defined in claim 2 wherein a hardening retarder is applied directly to said fiber-containing sprayed concrete layer before application of said synthetic resin, and after attaining hydratization of the fiber-containing sprayed concrete layer below the retarder the portion of said layer is removed to expose the projecting fibers.

4. The process defined in claim 3 wherein said corrosion resistant synthetic resin coating is provided as a multilayer coating wherein a final layer is a sealing layer.

5. The process defined in claim 4 wherein said synthetic resin also contains fiber pieces and said sealing layer contains paraffin.

6. A process for providing a corrosion resistant synthetic resin coating on an internal surface of a concrete structure in the form of a waste tank or conduit, which comprises the steps of:

subjecting said internal surface of said concrete structure to a cleaning treatment;

applying a fiber-containing sprayed concrete layer onto said internal surface subjected to said cleaning treatment so that fibers bonded in said layer project from a surface thereof, away from said concrete structure; and applying a corrosion resistant resin to said surface of said fiber-containing sprayed concrete layer and bonding said resin to the projecting fibers which thereby anchor said corrosion resistant synthetic resin coating to said fiber-containing sprayed concrete layer, said synthetic resin being a polyester resin and said fibers being glass fibers.

7. A concrete structure in the form of a tank conduit internally coated with a corrosion resistant synthetic plastic resin coating for a concrete structure comprises a fiber-containing sprayed concrete layer provided as an intermediate layer on said concrete structure, said fiber containing sprayed concrete layer having a plurality of fiber components mixed and distributed therein and projecting therefrom and a corrosion resistant synthetic resin layer above said fiber-containing sprayed concrete layer anchored on said fiber components.

8. The concrete structure defined in claim 7 wherein an additional filling and cementing layer is provided on said concrete structure under said fiber-containing sprayed concrete layer.

9. The concrete structure defined in claim 8 wherein said fiber components are glass fibers.

10. The concrete structure defined in claim 8 wherein said fiber components are plastic fibers.

11. The concrete structure defined in claim 8 wherein the synthetic plastic resin used in said corrosion resistant synthetic plastic resin layer is selected from a group consisting of a polyester resin, an epoxy resin, a polyurethane resin and an acrylic resin.

* * * * *